US007740432B2

(12) United States Patent
Harada

(10) Patent No.: US 7,740,432 B2
(45) Date of Patent: Jun. 22, 2010

(54) ARTICLE INSTALLATION DEVICE

(75) Inventor: Akinori Harada, Fujisawa (JP)

(73) Assignee: NIFCO Inc., Yokohama-shi (JP)

( * ) Notice: Subject to any disclaimer, the term of this patent is extended or adjusted under 35 U.S.C. 154(b) by 0 days.

(21) Appl. No.: 12/226,200

(22) PCT Filed: Jan. 31, 2007

(86) PCT No.: PCT/JP2007/051636

§ 371 (c)(1), (2), (4) Date: Nov. 18, 2008

(87) PCT Pub. No.: WO2007/122834

PCT Pub. Date: Nov. 1, 2007

(65) Prior Publication Data

US 2009/0162163 A1 Jun. 25, 2009

(30) Foreign Application Priority Data

Apr. 19, 2006 (JP) ............................ 2006-115999

(51) Int. Cl.
*F16B 13/06* (2006.01)

(52) U.S. Cl. ........................... 411/45; 411/508; 24/293; 24/297

(58) Field of Classification Search ............. 411/45-48, 411/509, 36, 18; 292/4, 17, 20; 24/293-295, 24/297
See application file for complete search history.

(56) References Cited

U.S. PATENT DOCUMENTS 3,988,808 A * 11/1976 Poe et al. ...................... 24/326
4,402,118 A * 9/1983 Benedetti ..................... 24/289
4,865,505 A * 9/1989 Okada ........................ 411/512
5,286,152 A * 2/1994 Anderson .................... 411/45
5,606,784 A * 3/1997 Hamamoto ................. 24/662
5,718,549 A 2/1998 Noda et al.
5,902,083 A * 5/1999 Hwang ........................ 411/48
6,145,173 A * 11/2000 Suzuki et al. ................. 24/662
6,665,914 B2 * 12/2003 Ogawa ........................ 24/297
6,676,348 B2 * 1/2004 Hoppe ......................... 411/48
6,827,536 B1 * 12/2004 Leon et al. .................... 411/61
7,207,758 B2 * 4/2007 Leon et al. .................... 411/45
7,553,116 B2 * 6/2009 Lesecq ........................ 411/45
2002/0050551 A1 5/2002 Yamada et al.

FOREIGN PATENT DOCUMENTS

JP H08-68406 3/1996
JP H08-210335 8/1996

* cited by examiner

*Primary Examiner*—Gary Estremsky
(74) *Attorney, Agent, or Firm*—Manabu Kanesaka

(57) ABSTRACT

An article-attaching device includes a casing and a holding member fitted into the casing. The holding member has engageable portions configured to be engageable with a hook of an article. The holding member includes a frame portion fitted to the casing and a pair of torsionally-deformable members extending downward from opposed portions of the frame portion. The torsionally-deformable members have engageable portions and a hook receiver under the engageable portions. A hook passes between the engageable portions from inside of the frame portion, causing the respective torsionally-deformable members to be elastically spread and be torsionally deformed, followed by entering the receiver to be prevented from coming out thereof.

18 Claims, 9 Drawing Sheets

2
31
B
33
29
23
30(3)
C
C
29
F
B
31

24
4
5
26
29
20
23
36
F
(25)34
26
31
32

F
23
30(2a)
27
31
33
29
29
28
28
32a
32
36
22a

ARTICLE INSTALLATION DEVICE

TECHNICAL FIELD

The present invention relates to an article-attaching device, which is adapted to be beforehand mounted to an object to attach an article thereto, such as a panel, and has an engageable portion disposed therein so as to prevent a hook of the article from coming off, although the article can be attached to the object by a fingertip operation.

BACKGROUND ART

FIGS. 9(*a*) and (*b*) show two examples of article-attaching devices previously proposed by the applicant. The device (clip) 50 shown in FIG. 9(*a*) in the two examples has been disclosed in Patent Document 1 listed below and is formed of a casing (outer casing) 51 mounted to an object to mount an article thereto, such as a panel, and a holding member (core member) 55 assembled to the casing 51 in order to be brought into elastic engagement with an article-side hook F. The casing 51 has a flange portion 52 formed on a top edge thereof, slots 53 formed in a peripheral portion thereof under the flange portion 52, an engageable flange portion 54 formed in a peripheral portion thereof under the slots 53, and unshown engageable pawls formed in opposed parts of an outer peripheral portion thereof under the engageable flange portion 54, the engageable flange portion serving to cover an outer surface of the object around a mounting hole formed in the object when the hole has received a counterpart of the casing, and the unshown engageable pawls serving to ensure a certain distance in connection with the engageable flange portion 54. The holding member 55 is formed of such a flat cylindrical member as to be housed in the casing 51. The holding member has projections 56 formed on an outer peripheral surface thereof, bulged portions 57 formed on an inner peripheral surface to confront each other, elastic engageable portions 58 formed on the inner surface under the bulged portions 57, the bulged portions 57 being configured to be connected to the cylindrical member at top and bottom ends and to have an upper portion constricted toward the bottom end and the remaining portion expanded, and the engageable portions serving to clamp the hook F in a detachable manner. The holding member is assembled to the casing 51 through the projections 56 and the slots 53. In this arrangement, when the hook F is pressed into between the bulged portions 57, the hook passes through between both bulged portions 57 since the respective engageable portions 58 are pressed from sides thereof close to the respective bulged portions 57 to be flexed in a symmetrical shape. After the hook has passed, both bulged portions 57 are elastically returned to the original positions to prevent the hook from coming off.

The device (holder) 60 shown in FIG. 9(*b*) has been disclosed in Patent Document 2 listed below and is formed of a casing 61 mounted to an object to mount an article thereto, such as a panel, and a holding member 66 assembled to the casing 61 in order to be brought into elastic engagement with an article-side hook F. The casing 61 has a flange portion 62 formed on a top edge thereof, rectangular slots 63*a* formed in a peripheral portion thereof under the flange portion 62, an engageable flange portion 64 formed in a peripheral portion thereof under the rectangular slots 63*a*, rectangular slots 63*b* formed in a peripheral portion thereof under the engageable flange portion 64, and unshown engageable pawls formed in a peripheral portion thereof close to the respective rectangular slots 63*b*, the engageable flange portion serving to cover an outer surface of the object around a mounting hole formed in the object when the hole has received a counterpart of the casing, and the unshown engageable pawls serving to ensure a certain distance in connection with the engageable flange portion 64. The casing 61 includes a wide space 65*a* and a narrow space 65*b* formed at upper and lower positions therein, respectively. The holding member 66 is formed in a substantially U-character shape in vertical section. The holding member has projections 67 formed on an outer peripheral surface thereof, elastic engageable portions 68 formed in an outer peripheral portion thereof so as to confront each other, and projections 69 formed on an inner surface thereof under the respective engageable portions 68. The holding member is switched from a temporary engaged state shown in this figure to an fully engaged state, the projections 67 of the holding member being brought into engagement with the upper rectangular slots 63*a* in the temporary engaged state and being brought into engagement with the lower rectangular slots 63*b* in the fully engaged state by a downward depressing force. In this arrangement, when the hook F is inserted into the holing member 66 in the temporary engaged state, the hook F elastically spreads the elastic engageable portions 68 and passes through between both projections 69 so as to be prevented from coming off. When the hook is further depressed, the hook F presses a bottom wall of the holding member 66 and moves to a deeper position in the casing 61 after the holding member 66 brings the projections 67 out of engagement with the rectangular slots 63*a*. Thus, the hook is set in the fully engaged state with the projections 67 being brought into engagement with the lower rectangular slots 63*b*. In the fully engaged state, the elastic engageable portions 68 have outer walls restrained at the narrow space 65*b* in the casing 61 to firmly hold the hook F.

Patent Document 1: Japanese Patent No. 3686444

Patent Document 2: JP-A-2002-39132

DISCLOSURE OF THE INVENTION

Problems that the Invention is to Solve

Each of the above-mentioned conventional article-attaching devices 50 and 60 is formed of two pieces of the casing 51 or 61 and the holding member 55 or 61. Each of the article-attaching devices can eliminate a forcible stripping operation from a mold and maintain a required accuracy for each part in comparison with a one-piece structure disclosed in, e.g. JP-A-11-230135. Although each of the above-mentioned conventional article-attaching devices can easily meet a requirement that there is a big difference between an inserting force required for inserting a hook in order to prevent a hook from coming off and a removing force required for removing the hook (holding force), the removing force required for removing the hook varies from product to product, making it difficult to be stabilized. Since emphasis is placed on easy-to-insert in each of the above-mentioned conventional article-attaching devices, a projection of respective parts is suddenly collapsed, or the engaged parts are easily disengaged from each other when the a hook is forcibly withdrawn.

It is an object of the present invention to solve the above-mentioned problems and to provide an article-attaching device, which is more convenient by having a big difference between a force required for inserting a hook and a removing force required for removing the hook (holding force) and minimizing the variations in the removing force.

Means of Solving the Problems

According to a first aspect of the present invention, there is provided an article-attaching device, which includes a casing adapted to be mounted to an object, such a panel, and a holding member configured to be fitted into the casing, the holding member having engageable portions configured to be elastically engageable with a hook of an article; the holding member including a frame portion configured to be fitted to the casing through an engageable system, and a pair of torsionally-deformable members extending downward from opposed portions of the frame portion, the torsionally-deformable members having the engageable portions formed on opposed inner sides thereof so as to project therefrom and a hook receiver formed therein under the engageable portions; and the respective torsionally-deformable members having the engageable portions formed on the opposed inner sides so as to have substantially the same projection length as each other and to be offset in a horizontal direction, whereby the hook passes through between the engageable portions from inside of the frame portion, causing the respective torsionally-deformable members to be elastically spread and be torsionally deformed, followed by entering the receiver to be prevented from coming off therein.

According to a second aspect of the present invention, there is provided an article-attaching device, which is different from the article-attaching device according to the first aspect in terms of the shape of the engageable portions, and which includes the respective torsionally-deformable members having the engageable portions formed on the opposed inner sides so that one of the engageable portions has a portion close to one end in a width direction thereof provided with a longer projection length than a portion close to the other end in the width direction while the other engageable portion has a portion close to a one end in a width direction thereof provided with a shorter projection length than a portion close to the other end in the width direction, whereby the hook passes through between the engageable portions from inside of the frame portion, causing the respective torsionally-deformable members to be elastically spread and be torsionally deformed, followed by entering the receiver to be prevented from coming off therein.

In the article-attaching device according to the present invention, it is preferred that the casing have clamping ribs formed on opposed inner sides thereof confronting the respective torsionally-deformable members of the holding member, the clamping ribs serving to clamp portions of the hook projecting from between the respective torsionally-deformable members in such a state that the hook is received in the receiver; that the casing have slits formed in both sides thereof confronting the respective torsionally-deformable members of the holding member, the slits serving to cause portions of the casing confronting the torsionally-deformable members to be easily deformable so as not to prevent the torsionally-deformable members from being spread and deformed; that the article-attaching device further include a restriction system, the restriction system being disposed between a bottom side of the casing and a lower end of the holding member to restrict an amount of torsional deformation of the torsionally-deformable members; and that the torsionally-deformable members of the holding member have portions thereof close to the engageable portions formed so as to be narrower than portions thereof close to the frame portion.

EFFECT OF THE INVENTION

In accordance with the first aspect of the present invention, the holding member is fitted to the casing at the frame portion formed in an upper portion thereof, and the holding member has the paired torsionally-deformable members extending downward, the torsionally-deformable members having the engageable portions formed thereon and the hook receiver formed at a bottom portion thereof. The respective torsionally-deformable members have the engageable portions formed on the opposed inner sides thereof so as to have substantially the same projection length as each other and to be offset in the horizontal direction. By this arrangement, it is possible not only to subject the respective torsionally-deformable members to torsional deformation so as to reduce an insertion force required for inserting a hook but also to provide a big difference between the insertion force and a removing force required for removing the hook (holding force). It is also possible to improve required characteristics by minimizing the variations in the removing force in comparison with the arrangements disclosed in Patent Document 1 and Patent Document 2.

In accordance with the second aspect of the present invention, the holding member is fitted to the casing at the frame portion formed in an upper portion thereof, and the holding member has the paired torsionally-deformable members extending downward, the torsionally-deformable members having the engageable portions formed thereon and the hook receiver formed at a bottom portion thereof. The respective torsionally-deformable members have the engageable portions formed on the opposed inner sides thereof so that one of the engageable portions has a projection length gradually decreasing from a left edge thereof toward a right edge thereof while the other engageable portion has a projection length gradually decreasing from a right edge thereof toward a left edge thereof. By this arrangement, it is possible not only to subject the respective torsionally-deformable members to torsional deformation so as to reduce an insertion force required for inserting a hook but also to provide a big difference between the insertion force and a removing force required for removing the hook (holding force). It is also possible to improve required characteristics by minimizing the variations in the removing force in comparison with the arrangements disclosed in Patent Document 1 and Patent Document 2.

In the article-attaching device according to the present invention, when the casing has clamping ribs formed on opposed inner sides thereof confronting the respective torsionally-deformable members of the holding member, the clamping ribs serving to clamp portions of the hook projecting from between the respective torsionally-deformable members in such a state that the hook is received in the receiver, it is possible to stably maintain the hook in an engaged state to minimize the variations in the removing force (holding force) since the hook is clamped between the clamping ribs on the casing. In the article-attaching device according to the present invention, when the casing has slits formed in both sides thereof confronting the respective torsionally-deformable members of the holding member, the slits serving to cause portions of the casing confronting the torsionally-deformable members to be easily deformable, it is possible not to prevent the torsionally-deformable members from being spread and deformed in order to avoid an increase in the required insertion force since even if one of the torsionally-deformable members is spread and deformed to be brought into contact with the corresponding inner side of the casing in a case where the clearance between each of the inner sides of the casing and each of the torsionally-deformable members is set at a small value, the corresponding inner side is deformed by the provision of the slits.

In the article-attaching device according to the present invention, when the article-attaching device further include the restriction system, the restriction system being disposed between the bottom side of the casing and the lower end of the holding member to restrict an amount of torsional deformation of the torsionally-deformable members, it is possible to minimize the variations in the insertion force and the removing force (holing force) since the restriction system prevents the respective torsionally-deformable members from being excessively twisted. In the article-attaching device according to the present invention, when the torsionally-deformable members of the holding member have the portions close to the engageable portions formed so as to be narrower than the portions close to the frame portion, it is possible to make it easy for the portions close to the engageable portions to be torsionally deformed so as to definitely reduce the insertion force when inserting the hook since the portions close to the engageable portions are thinner than, e.g. portions of the torsionally-deformable members close to the top ends.

BEST MODE FOR CARRYING OUT THE INVENTION

Figure 1:
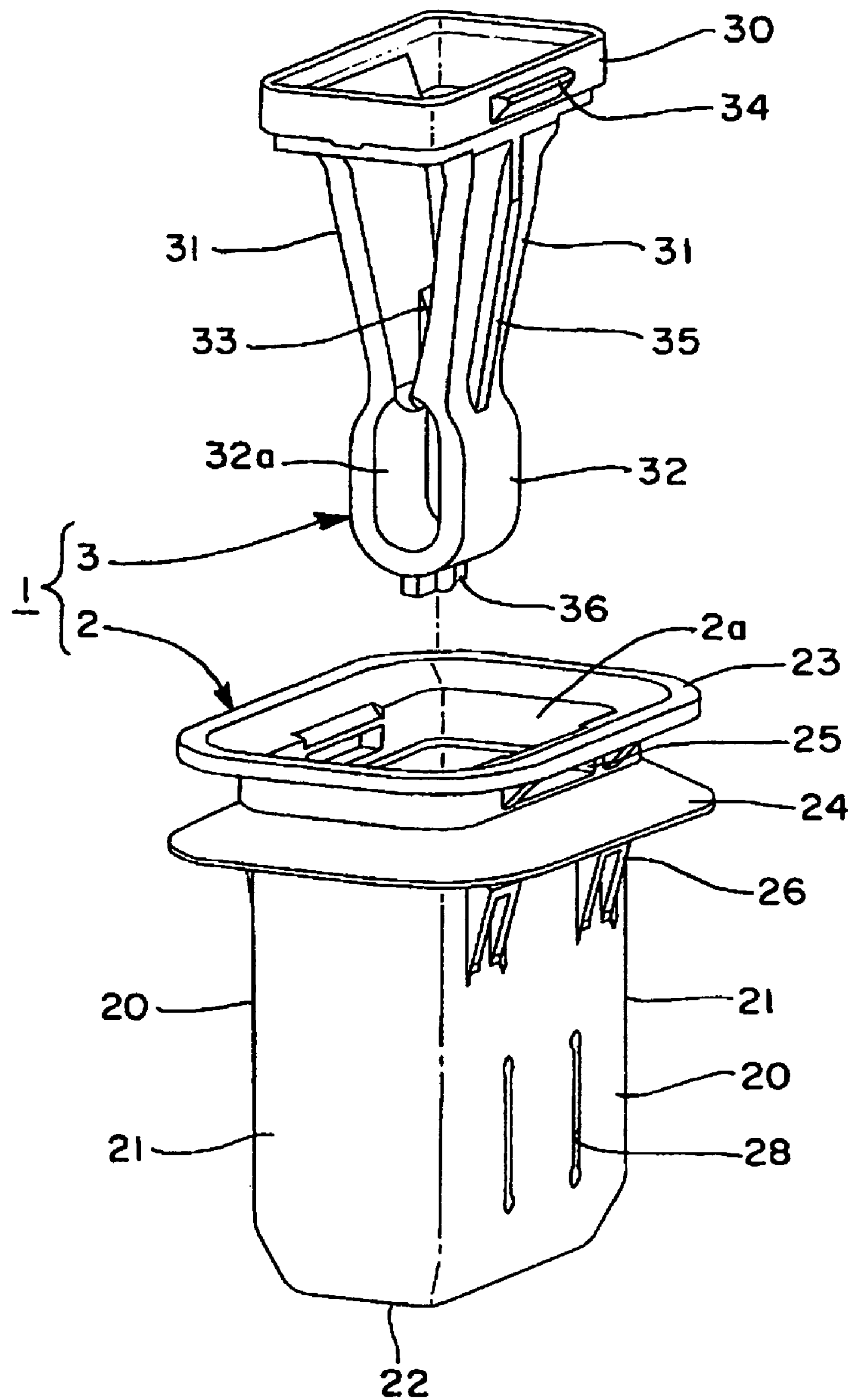
FIG. 1 is a perspective view showing the article-attaching device according to an embodiment of the present invention in a separate state.
Figure 2A:
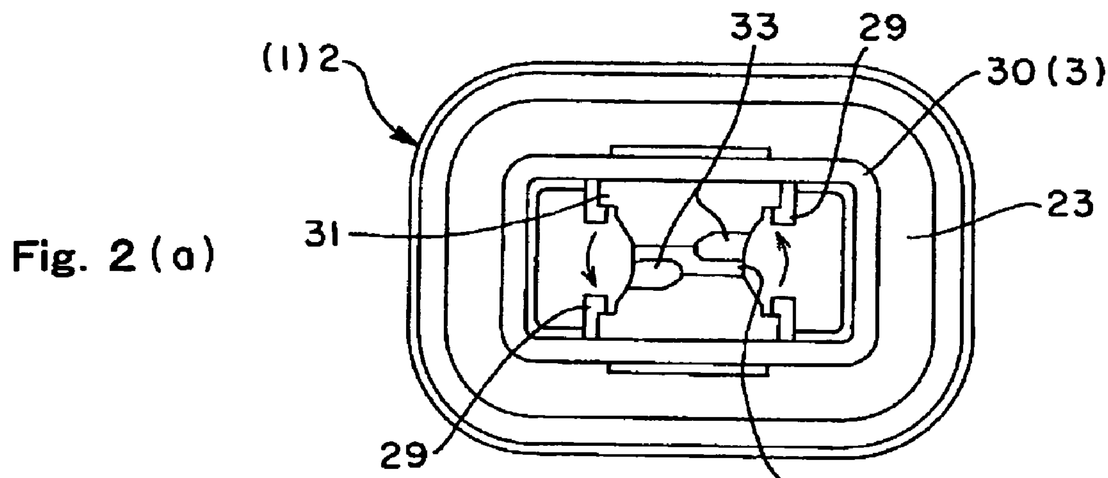
FIGS. 2(*a*) to (*c*) are a plan view, a front view and a bottom view showing the article-attaching device shown in FIG. 1.
Figure 2B:
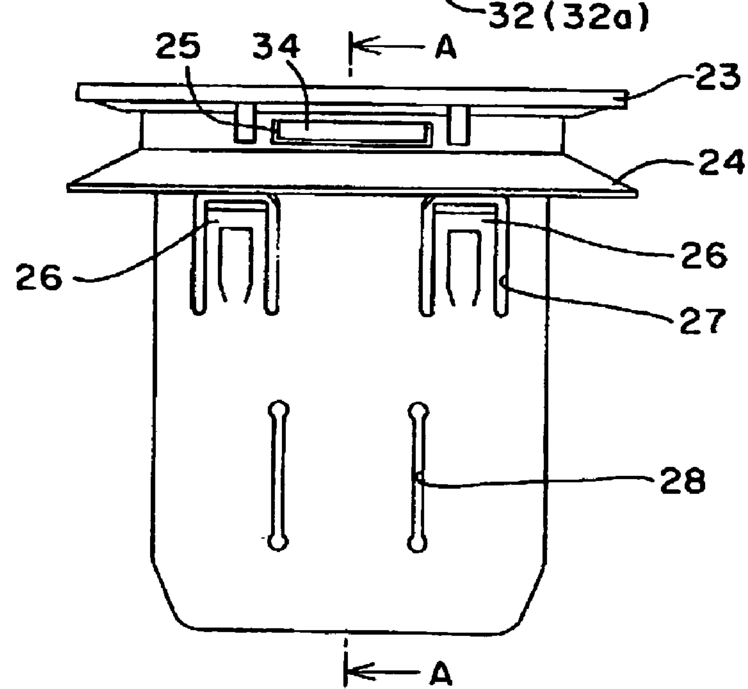
Figure 2C:
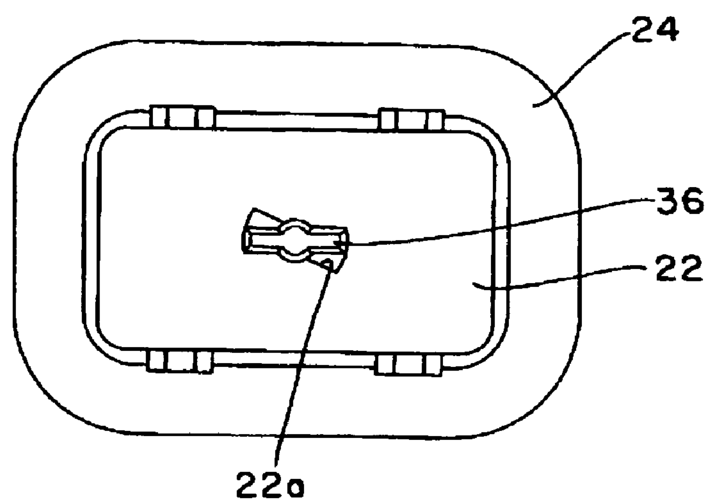

Now, embodiments of the present invention will be described with reference to the accompanying drawings. The description will be made in the order of the structure, the assembly and the operation of the device according to the present invention shown in FIG. 1 to FIG. 7 and a modified embodiment of the device according to the present invention shown in FIG. 8.

(Structure)

The article-attaching device 1 shown in FIG. 1 to FIG. 5 is formed of a casing 2 having an upper opening, and a holding member 3 configured to be assembled to an inner side of the casing 2, and is normally handled with the holding member 3 being fitted into the casing 2. Each of the casing 2 and the holding member 3 is formed of a resin-molded product (made of polypropylene or polyoxymethylene) or another product made of materials other than the resin.

The casing 2 is in the form of a container having a substantially rectangular cubic shape and has front and rear sides 20 and 20, and right and left sides 21 and 21, the front and rear sides being wider than the right and left sides. The casing includes an engagement portion 2*a*, a restriction slot 22*a* formed in a bottom side 22, an upper flange portion 23, and an lower umbrella-shaped flange portion 24, the engagement portion having an upper inner face formed so as to be one-step wider inside the casing, and the upper flange portion projecting from an upper peripheral edge of the casing.

Figures 3A, 3B, 3C:
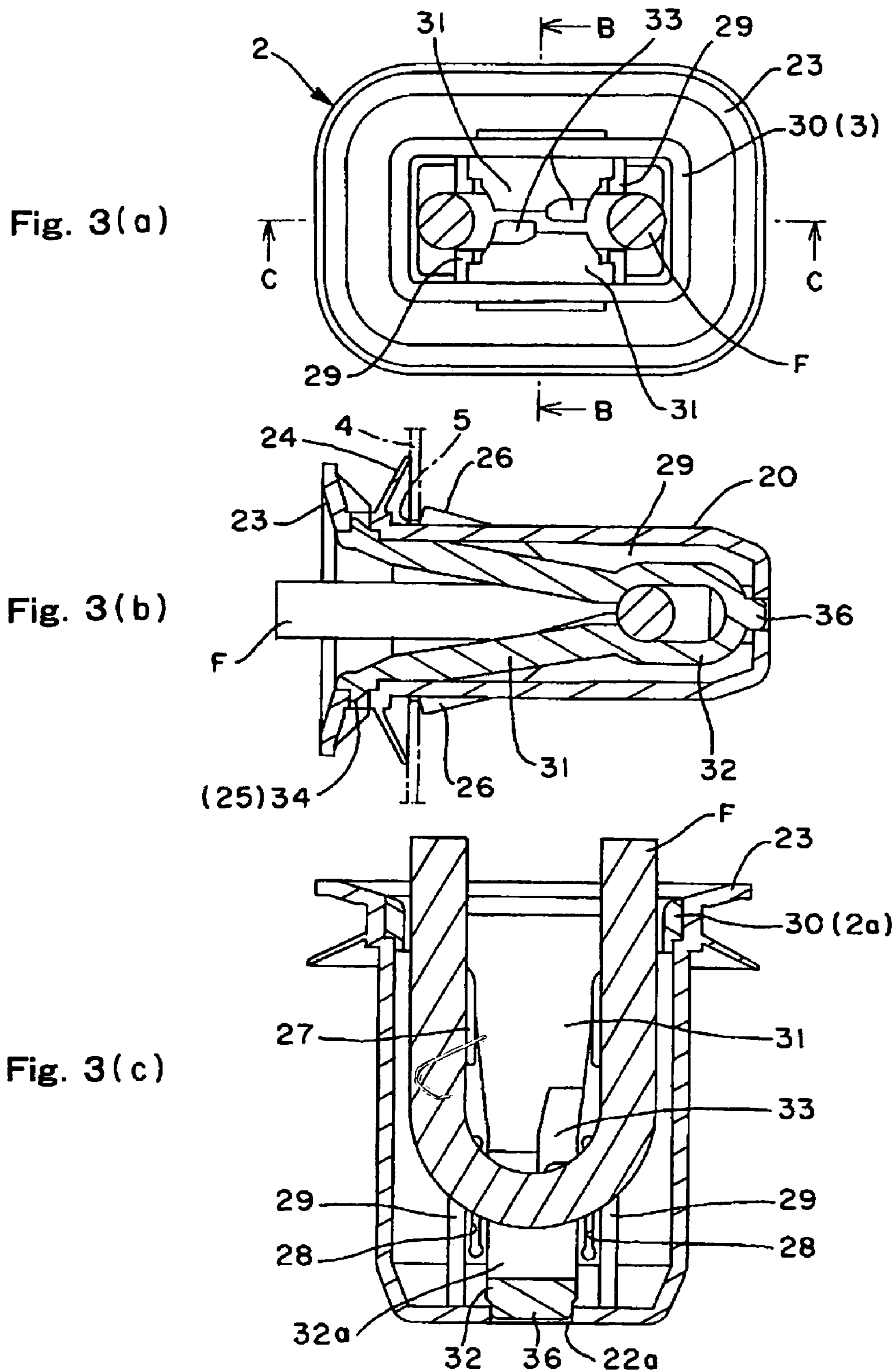
FIGS. 3(*a*) to (*c*) are a plan view showing how a article-side hook is brought into engagement with the article-attaching device, a cross-sectional view taken along line B-B of the plan view, and a cross-sectional view taken along line C-C of the plan view.
Figure 4:
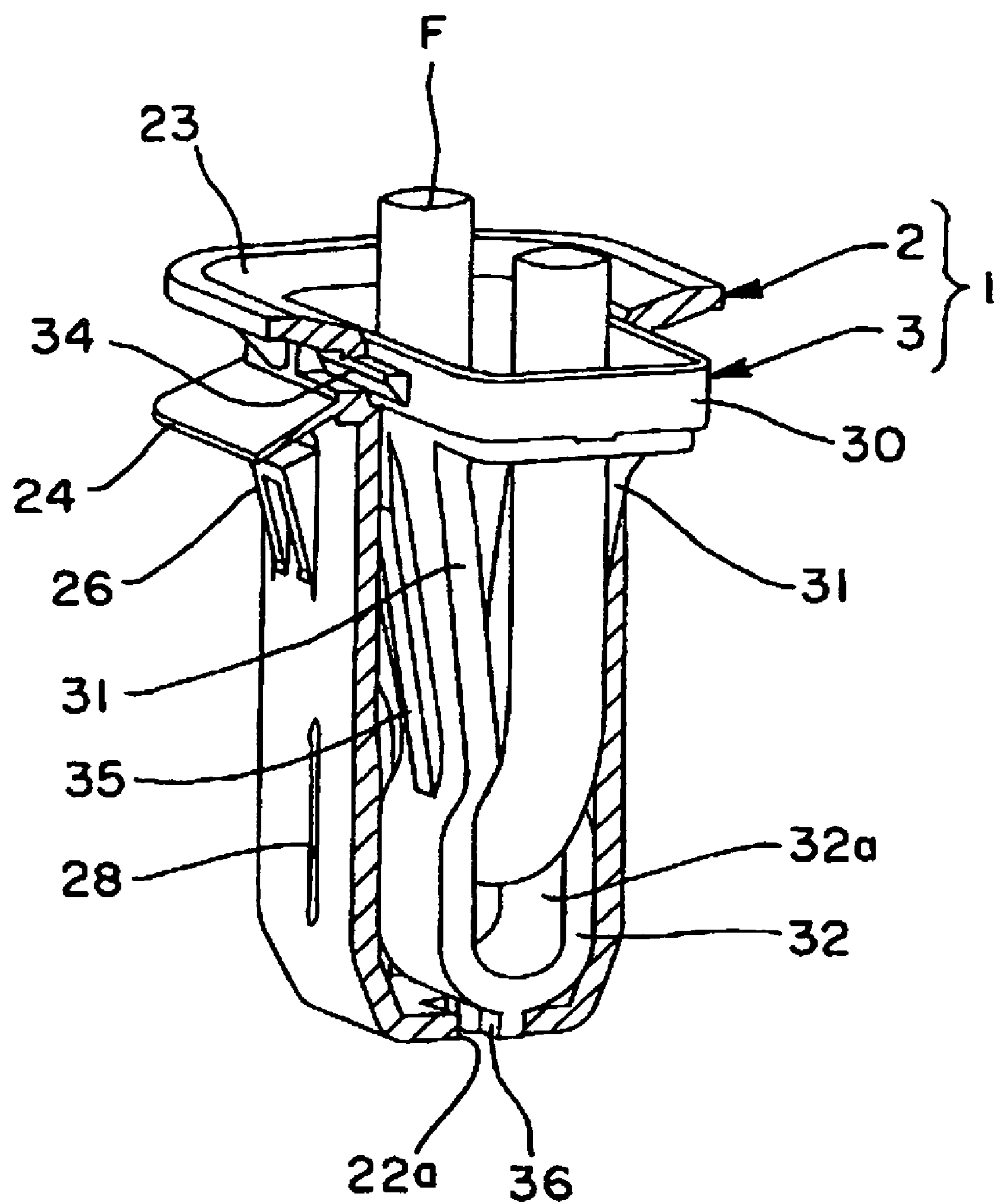
FIG. 4 is a perspective and partial sectional view showing how the article-side hook is brought into engagement with the article-attaching device.

The engagement portion 2*a* is configured to be of such size as to receive a frame portion 30 of the holder 3, which will be described later. The restriction slot 22*a* serves to form a restriction system along with a projection 36 of the holding member 3 and is formed as an elongated rectangular slot, which extends to be oblique about a substantial center of the bottom side 22. The upper inner face of the upper flange portion 23 has a taper inclined downward toward inside of the casing 2 so as to stably receive an article with a hook F projecting therefrom when a counterpart of the article is brought into contact with the upper flange portion for example. When as shown in FIG. 3(*b*), a lower part of the casing 2 is inserted into a mounting hole 5 formed in a panel 4 as the object to mount the article thereto, the lower flange portion 24 is brought into contact with the panel 4 so as to cover a face portion of the panel around the mounting hole 5, serving to limit the insertion amount of the casing 2 into the mounting hole 5 and to prevent a liquid from coming in and out through the mounting hole 5.

The front and rear sides 20 and 20 have engagement holes 25 formed in a peripheral part between the upper flange portion 23 and the lower flange portion 24 so as to confront each other, right and left elastic engageable claws 26 and 26 formed in portions of the peripheral part just under the lower flange portion 24 so as to confront each other in pairs, vertical slits 28 formed in portions of the peripheral part just under the engagement claws so as to confront each other in pairs, and vertical ribs 29 formed on inner sides thereof so as to confront each other in pairs.

Each of the engagement holes 25 is formed as a rectangular hole. Each of the engageable claws 26 is defined by a U-character shaped slit 27, each pair of the slits being formed in each of the front and rear sides. Each of the vertical slit 28 is positioned between the vertical ribs 29 and 29 on the inner side close thereto. Each of the vertical slits serves as a cutout to make it for a portion of each of the front and rear sides between each pair of vertical slits to be easily deformed. Each pair of vertical ribs 29 serves as a pair of ribs for clamping a counterpart of the hook F from both sides.

On the other hand, the holding member 3 includes the frame portion 30 configured to be fitted to the casing 2, and a pair of torsionally-deformable members 31 and 31 extending downward from opposed portions of the frame portion 30, the torsionally-deformable members having engageable portions 33 formed on opposed inner sides thereof so as to project therefrom and a hook receiver 32*a* formed therein under the engageable portions 33. When the holding member is fitted to the casing 2 so as to have contact with the casing at the frame portion 30, the respective torsionally-deformable members 31 are located, with play, between the vertical ribs 29 formed side by side inside the casing 2.

The frame portion 30 is formed in a rectangular shape and has engageable portions 34 formed on outer faces of the long sides. The respective torsionally-deformable members 31 extend downward from middle portions of the long sides of the frame portion 30 so as to confront each other and have lower ends coupled by a coupling portion 32. Portions of the torsionally-deformable members close to the coupling portion 32 are formed to have a smaller width than portions of the torsionally-deformable members close to the frame portion 30, making it easy for the torsionally-deformable members close to the coupling portion to be torsionally deformed. The respective torsionally-deformable members 31 are configured to ensure a greatest distance therebetween at a position close to the frame portion 30 and a smallest distance at a position just above the coupling portion 32. The respective torsionally-deformable members have the engageable portions 33 formed on the opposed inner sides thereof, which are gradually closer to each other. Reference numeral 35 designates a reinforcing rib formed on an outer side of each of the torsionally-deformable members 31 so as to extend in a longitudinal direction.

The coupling portion 32 is formed in a substantially U-character shape and is configured to house the hook F in the receiver 32*a* formed therein. The coupling portion 32 has a middle bottom portion formed with the projection 36, which forms the restriction system along with the above-mentioned restriction slot 22*a*, and which projects downward from the middle bottom portion. The projection 36 is brought into engagement with the restriction slot 22*a* when the holding member 3 is fitted into the casing 2 so as to have contact with the casing at the frame portion 30.

Figure 7A:
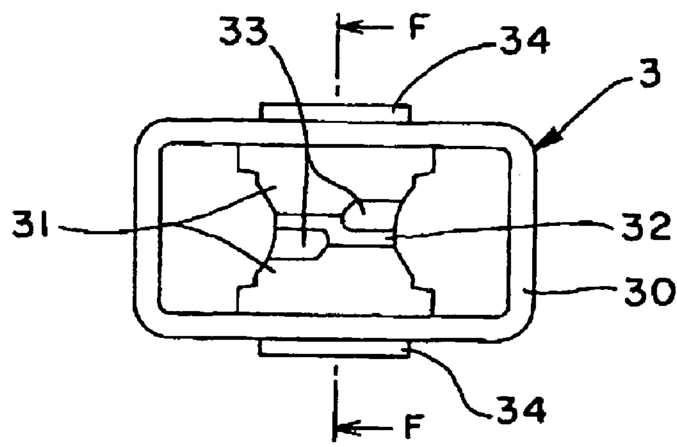
FIGS. 7(*a*) to (*c*) are a plan view showing the holding member of the article-attaching device, a cross-sectional view taken along line F-F of the plan view, and a front view of the holding member.
Figure 7B:
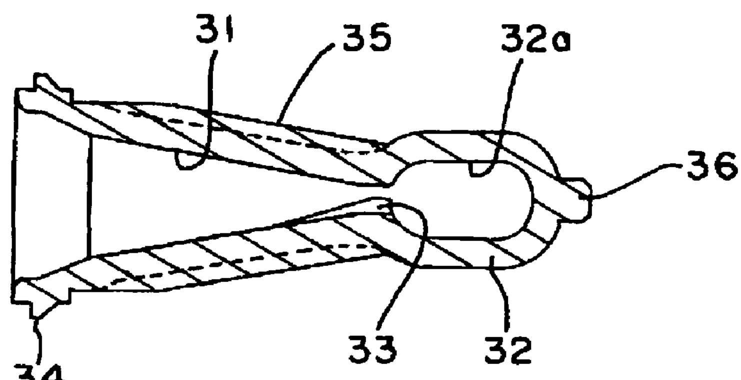
Figure 7C:
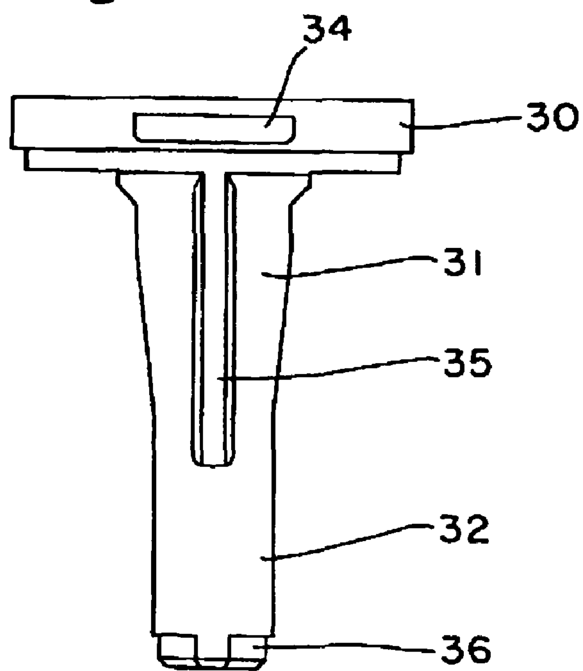

The engageable portions 33 are formed on the opposed inner sides of the torsionally-deformable members 31 so as to have substantially the same projection length as each other and to be offset in a horizontal direction as shown in FIG. 7. The engageable portions are tapered so as to have a greatest projection length at portions close to the receiver 32*a* and to gradually decrease the projection length from downward to upward. In other words, although the engageable portion 33 formed on the inner side of one of the torsionally-deformable members 31 is a tapered convex portion having substantially the same size as the engageable portion 33 formed on the inner side of the other torsionally-deformable member 31, the engageable portion formed on the inner side of the one torsionally-deformable member occupies a portion of the inner side from a right edge to a position before a middle position in a right-to-left direction while the engageable portion formed on the inner side of the other torsionally-deformable member occupies a portion from a left edge to a position before the middle position in a right-to-left direction. Further, the one engageable portion and the other engageable portion ensure a distance therebetween.

(Assembly and the Like)

When the above-mentioned holding member 3 is inserted into the casing 2 through the upper opening as shown in FIG. 1, the holding member is fitted to the casing with the frame portion 30 and the engageable portions 34 are brought into engagement with the engageable portion 2*a* and the engagement holes 25, respectively. In this assembles state, the frame portion 30 is held so as not to be movable with respect to the casing 2 by making use of the engagement portion 2*a*, each of the torsionally-deformable members 31 is located, with play, between its associated ribs 29 formed side by side in the casing 2, and the projection 36 is brought into engagement with the restriction slot 22*a* so as to be swingable by a certain angle. The article-attaching device 1 thus assembled is mounted into the mounting hole 5 formed in the panel 4 through the casing 2 as shown in FIG. 3(*b*) for example. In the mounting operation, the casing 2 of the article-attaching device 1 is pressed into the mounting hole 5 from the lower part thereof. By this mounting operation, the plural engageable claws 26, which project from the casing 2, are brought into contact with the edge of the mounting hole 5 to be electrically retracted and return to the original projection state after passing the edge of the mounting hole 5. Then, the article-attaching device 1 is detachably fitted to the panel 4 with the panel 4 being clamped between the engageable claws and the lower flange portion 24.

(Operation)

Figure 5A:
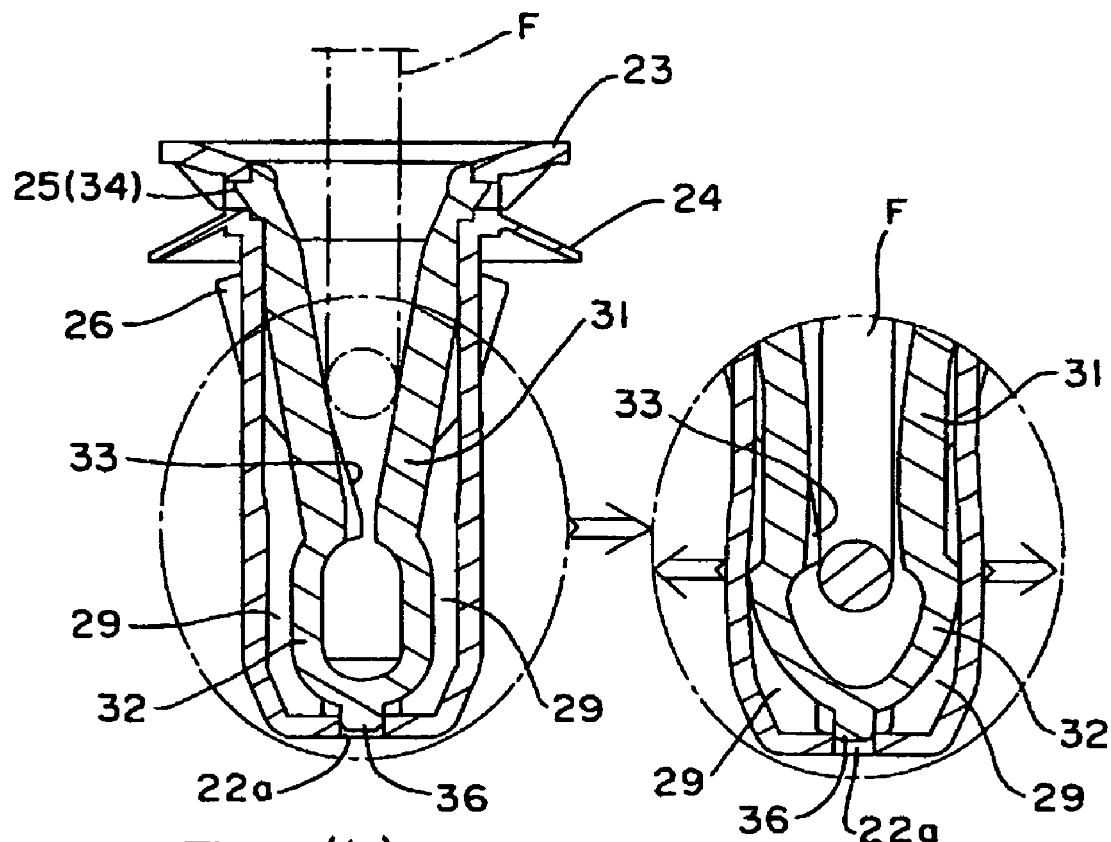
FIGS. 5(*a*) and (*b*) are a view showing a cross-sectional shape of the article-attaching device and an operation of some parts of the article-attaching device, and a side view of a holding member of the article-attaching device.
Figure 5B:
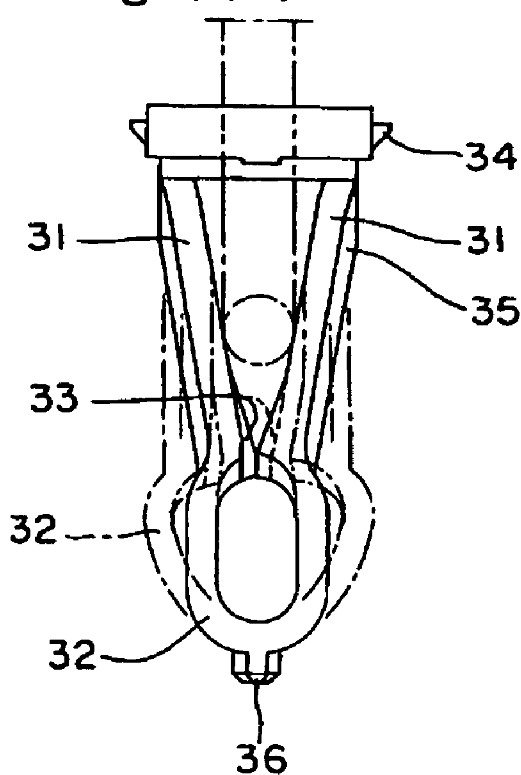
Figure 6A:
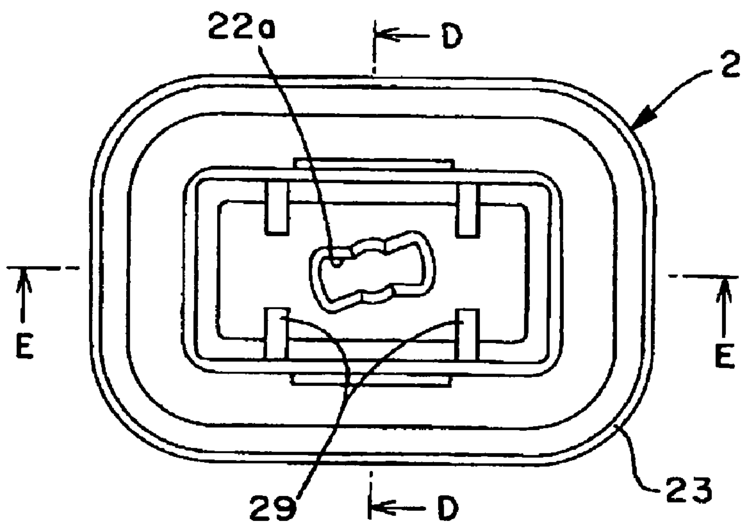
FIGS. 6(*a*) to (*c*) are a plan view showing a casing of the article-attaching device, a cross-sectional view taken along line D-D of the plan view, and a cross-sectional view taken along line E-E of the plan view.
Figure 6B:
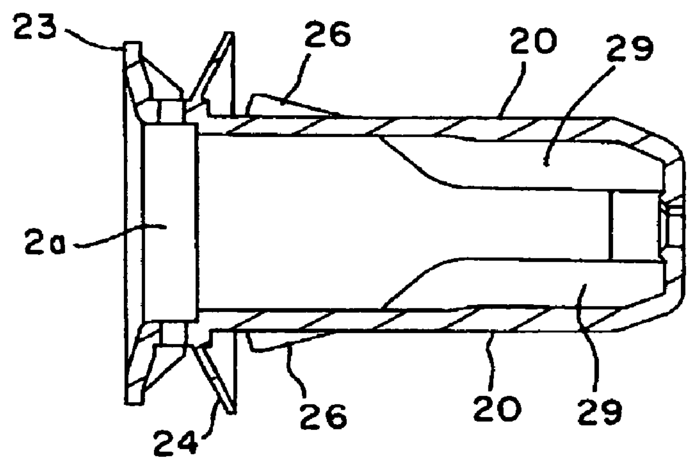
Figure 6C:
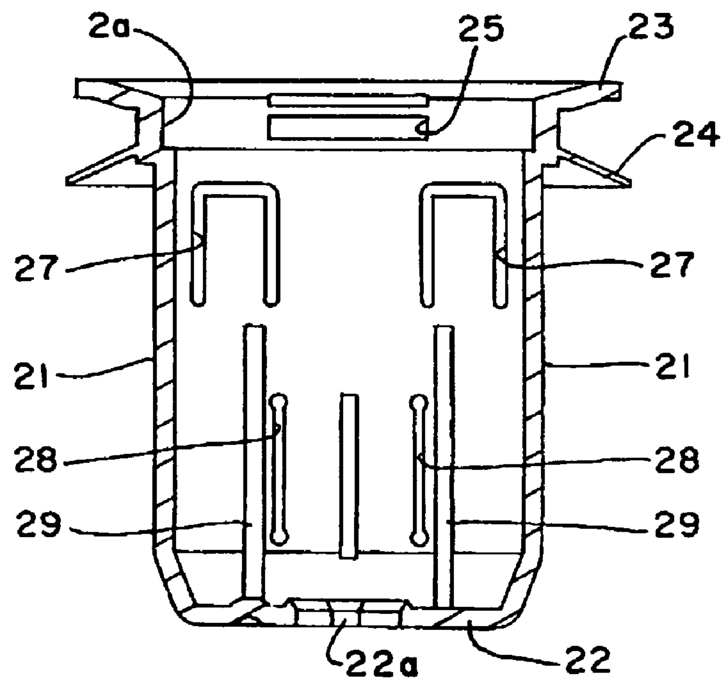

The article-side hook F is inserted in the frame portion 30 of the holding member in the casing 2 forming the article-attaching device 1 as shown in FIG. 5, the hook passes through between the engageable portions 33 from inside of the frame portion 30, causing the respective torsionally-deformable members 31 to be elastically spread and torsionally deformed, and the hook enters the receiver 32 to be prevented from coming off therein.

By this arrangement, it is possible not only to subject the respective torsionally-deformable members 31 to torsional deformation so as to reduce an insertion force required for inserting the hook but also to increase the difference between the insertion force and a moving force (holding force) required for moving the hook. The casing is configured so that when the respective torsionally-deformable members 31 are spread and deformed to the maximum, each of the torsionally-deformable members is brought into contact with a portion of the inner side of the casing between a pair of vertical slits 28 and elastically deforms that portion to prevent the application of a excessive load. When the hook F is pressed into between the torsionally-deformable members 31 from the frame portion 30, the respective torsionally-deformable members 31 are elastically spread and torsionally deformed because of being subjected to the depressing force applied to the hook F through the engageable portions 33. However, the above-mentioned restriction system serves to prevent the respective torsionally-deformable members 31 from being excessively torsionally deformed since the swingable range of the projection 36 is restricted to the certain angle by the specific form of the restriction hole 22*a*. The reason is that if the respective torsionally-deformable members 31 are excessively torsionally deformed by a low stress, it is difficult to maintain the removing force (holding force) at a required level. In other words, in the above-mentioned embodiment, the force required for insertion of the hook F is also decreased by providing the respective torsionally-deformable members 31 with the engageable portions 33 at positions apart from the restriction slot 22*a* in order to be easily twisted, and the removing force (holding force) required for removing the hook F is also increased by providing the restriction slot 22*a* in order to make it difficult for the respective torsionally-deformable members 31 to be twisted, for example.

Modified Embodiment

Figure 8:
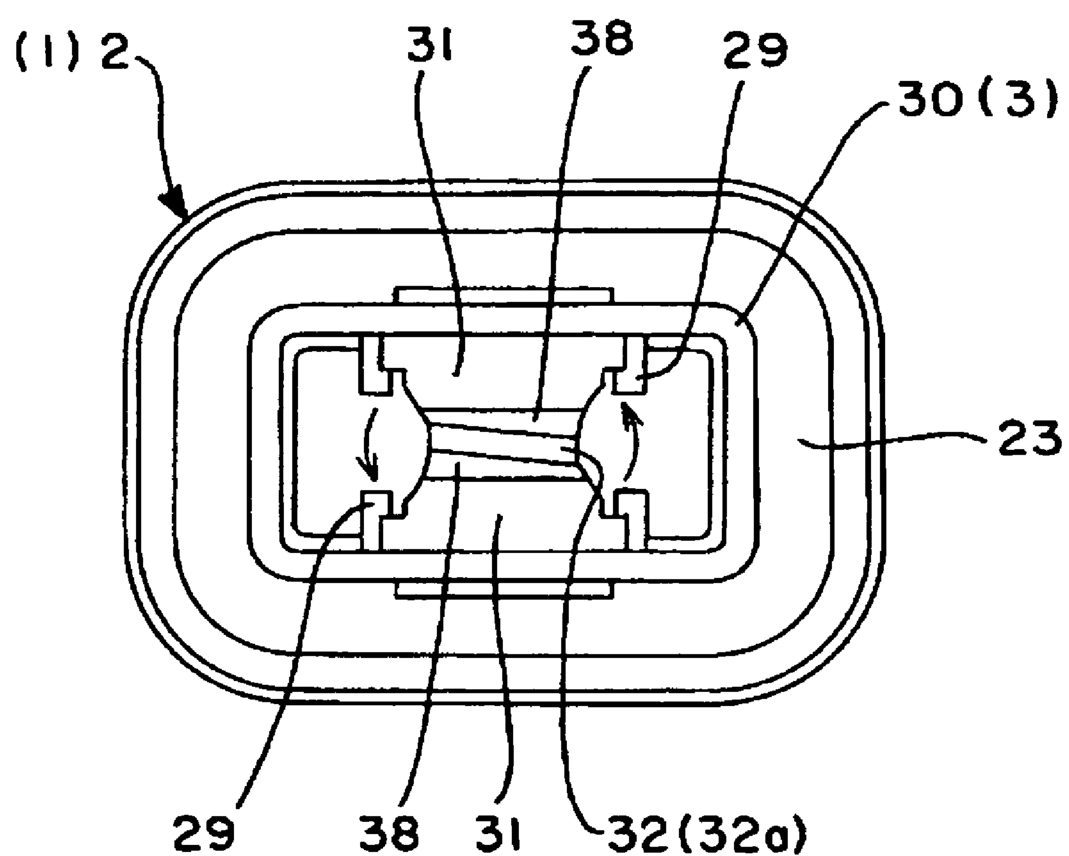
FIG. 8 is a plan view of a modified embodiment of the present invention, which corresponds to FIG. 2(*a*)
Figure 9A:
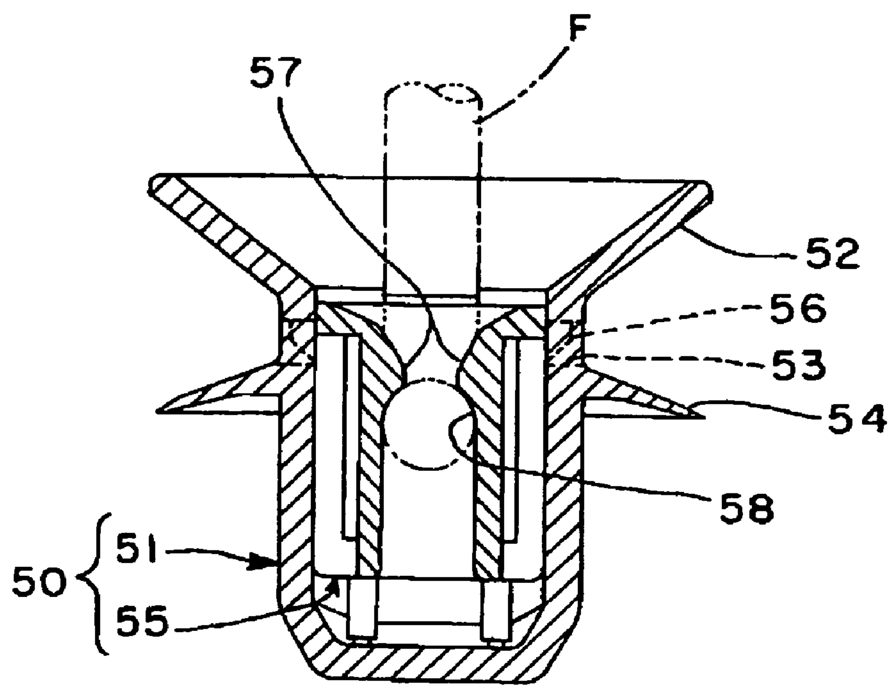
FIGS. 9(*a*) and (*b*) are schematic views showing the structures disclosed in Patent Documents 1 and 2.
Figure 9B:
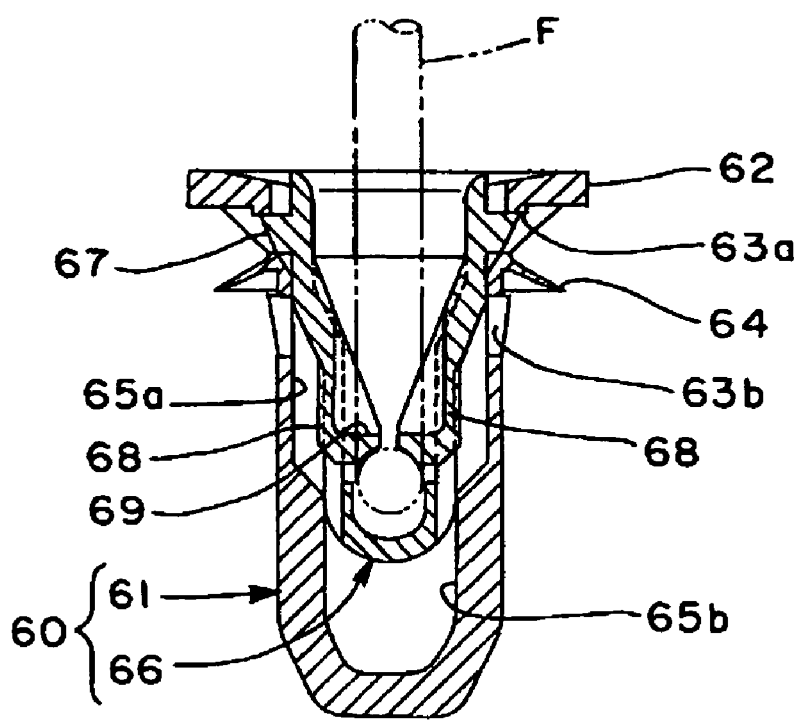

The article-attaching device 1 shown in FIG. 8 is one according to a modified embodiment, wherein the shapes of the engageable portions of the holding member 3 are modified. Explanation of the modified embodiment will be made so as to remove redundant description as much as possible by allotting the same reference numerals to the same members and parts as those of the above-mentioned embodiment.

In FIG. 8, the holding member 3 includes a frame portion 30 and a pair of torsionally-deformable members 31 and 31 extending downward from opposed portions of the frame portion 30, the torsionally-deformable members having engageable portions 38 formed on opposed inner sides thereof so as to project therefrom and a hook receiver 32_a_ formed therein under the engageable portions 38. The engageable portions 38 of the respective torsionally-deformable members are formed on the opposed inner sides of the respective torsionally-deformable members 31 so that one of the engageable portions has a portion close to one end in a width direction thereof provided with a longer projection length than a portion close to the other end in the width direction while the other engageable portion has a portion close to a one end in a width direction thereof provided with a shorter projection length than a portion close to the other end in the width direction. In other words, although the engageable portion 38 formed on the inner side of one of the torsionally-deformable members 31 and the engageable portion 38 formed on the inner side of the other torsionally-deformable member 31 are both formed in substantially the same tapered convex portion as each other, both of the engageable portions 38 are configured to be slant in opposite directions and to ensure a certain distance therebetween. By this arrangement, it is possible not only to subject the respective torsionally-deformable members 31 to torsional deformation so as to reduce an insertion force required for inserting a hook but also to provide a big difference between the insertion force and a removing force required for removing the hook (holding force). It is also possible to improve required characteristics by minimizing the variations in the removing force in comparison with the arrangements disclosed in Patent Document 1 and Patent Document 2. The respective torsionally-deformable members 31 are not restricted by the mounting hole 5 formed in a panel and are inserted so as to ensure a distance therebetween in the casing 2 in comparison with the one-piece structure disclosed in the above-mentioned JP-A-11-230135. Thus, it is possible to make it easy for the torsionally-deformable members to be twisted in the insertion operation. It is also possible to reduce the insertion force even if the removing force (holding force) is maintained at a similar level.

Obviously, numerous modifications and variations of detailed parts according to the present invention are possible in light of the above teachings. Although the present invention has been proposed for a case where the article is a seat disposed on the floor of an automobile, the article may be any other items than such a seat. The hook F is not limited to be formed in a U-character shape, and the hook may be formed in an L-character shape or the like. When the article is a seat, the device according to the present invention is disposed so as to project from a lower end of the seat. For example, when the article is a belt-like member, such a belt, the device according to the present invention may be disposed on a leading side of the article.

The entire disclosure of Japanese Patent Application No. 2006-115999 filed on Apr. 19, 2006 including specification, claims, drawings and summary are incorporated herein by reference in its entirety.

The invention claimed is:

1. An article-attaching device comprising:

a casing adapted to be mounted to an object; and a holding member formed separately and configured to be fitted into the casing, the holding member having engageable portions configured to be elastically engageable with a hook of an article;

the holding member comprising:

a frame portion configured to be fitted to the casing through an engageable system; and a pair of torsionally-deformable members extending downward from opposed portions of the frame portion, the torsionally-deformable members having the engageable portions formed on opposed inner sides thereof so as to project therefrom and a hook receiver formed therein under the engageable portions, wherein the respective torsionally-deformable members have the engageable portions formed on the opposed inner sides so as to have substantially the same projection length as each other and to be offset in a horizontal direction, whereby the hook passes through between the engageable portions from inside of the frame portion, causing the respective torsionally-deformable members to be elastically spread and to be torsionally deformed, followed by entering the receiver to be prevented from coming out therefrom; and wherein the casing has opposed inner sides so as to confront the respective torsionally-deformable members of the holding member therebetween and to clamp portions of the hook projecting between the respective torsionally-deformable members in such a state that the hook is received in the receiver.

2. The article-attaching device according to claim 1, wherein the casing has clamping ribs formed on the opposed inner sides thereof confronting the respective torsionally-deformable members of the holding member, the clamping ribs serving to clamp portions of the hook projecting from the respective torsionally-deformable members in such a state that the hook is received in the receiver.

3. The article-attaching device according to claim 1, wherein the casing has slits formed in both sides thereof confronting the respective torsionally-deformable members of the holding member, the slits serving to cause portions of the casing confronting the torsionally-deformable members to be easily deformable so as not to prevent the torsionally-deformable members from being spread and deformed.

4. The article-attaching device according to claim 1, further comprising a restriction system, the restriction system being disposed between a bottom side of the casing and a lower end of the holding member to restrict an amount of torsional deformation of the torsionally-deformable members.

5. The article-attaching device according to claim 1, wherein the torsionally-deformable members of the holding member have portions thereof close to the engageable portions formed so as to be narrower than portions thereof close to the frame portion.

6. The article according to claim 1, wherein the casing member has a restriction slot formed in a bottom side thereof and the holding member has a projection at a lower end thereof, the projection being configured to engage in the restriction slot when the holding member is fitted into the casing.

7. The article-attaching device according to claim 6, wherein the restriction slot and the projection comprise a restriction system which restricts torsional deformation of the pair of torsionally-deformable members.

8. The article attaching device according to claim 6, wherein the hook receiver has an essentially U-shaped configuration and is formed at the lower end of the holding member, and the projection extends from a bottom end of the essentially U-shaped hook receiver.

9. An article-attaching device comprising:

a casing adapted to be mounted to an object, and a holding member formed separately and configured to be fitted into the casing, the holding member having engageable portions configured to be elastically engageable with a hook of an article;

the holding member comprising:

a frame portion configured to be fitted to the casing through an engageable system, and a pair of torsionally-deformable members extending downward from opposed portions of the frame portion, the torsionally-deformable members having the engageable portions formed on opposed inner sides thereof so as to project therefrom and a hook receiver formed therein under the engageable portions, wherein the respective torsionally-deformable members have the engageable portions formed on the opposed inner sides so that one of the engageable portions has a portion close to one end in a width direction thereof provided with a longer projection length than a portion close to the other end in the width direction while the other engageable portion has a portion close to a one end in a width direction thereof provided with a shorter projection length than a portion close to the other end in the width direction, whereby the hook passes through between the engageable portions from inside of the frame portion, causing the respective torsionally-deformable members to be elastically spread and be torsionally deformed, followed by entering the receiver to be prevented from coming out therefrom; and wherein the casing has opposed inner sides so as to confront the respective torsionally-deformable members of the holding member therebetween and to clamp portions of the hook projecting between the respective torsionally-deformable members in such a state that the hook is received in the receiver.

10. The article-attaching device according to claim 9, wherein the casing has clamping ribs formed on the opposed inner sides thereof confronting the respective torsionally-deformable members of the holding member, the clamping ribs serving to clamp portions of the hook projecting between the respective torsionally-deformable members in such a state that the hook is received in the receiver.

11. The article-attaching device according to claim 9, wherein the casing has slits formed in both sides thereof confronting the respective torsionally-deformable members of the holding member, the slits serving to cause portions of the casing confronting the torsionally-deformable members to be easily deformable so as not to prevent the torsionally-deformable members from being spread and deformed.

12. The article-attaching device according to claim 9, further comprising a restriction system, the restriction system being disposed between a lower end of the casing and a lower end of the holding member to restrict an amount of torsional deformation of the torsionally-deformable members.

13. The article-attaching device according to claim 9, wherein the torsionally-deformable members of the holding member have portions thereof close to the engageable portions formed so as to be narrower than portions thereof close to the frame portion.

14. The article according to claim 9, wherein the casing member has a restriction slot formed in a bottom side thereof and the holding member has a projection at a lower end thereof, the projection being configured to engage in the restriction slot when the holding member is fitted into the casing.

15. The article-attaching device according to claim 14, wherein the restriction slot and the projection comprise a restriction system which restricts torsional deformation of the pair of torsionally-deformable members.

16. The article attaching device according to claim 14, wherein the hook receiver has an essentially U-shaped configuration, and is formed at the lower end of the holding member, and the projection extends from a bottom end of the essentially U-shaped hook receiver.

17. An article-attaching device comprising:

a casing adapted to be mounted to an object; and a holding member configured to be fitted into the casing, the holding member having engageable portions configured to be elastically engageable with a hook of an article;

the holding member comprising:

a frame portion configured to be fitted to the casing through an engageable system, and a pair of torsionally-deformable members extending downward from opposed portions of the frame portion, the torsionally-deformable members having the engageable portions formed on opposed inner sides thereof so as to project therefrom and a hook receiver formed therein under the engageable portions, wherein the respective torsionally-deformable members has the engageable portions formed on the opposed inner sides so as to have substantially the same projection length as each other and to be offset in a horizontal direction, whereby the hook passes through between the engageable portions from inside of the frame portion, causing the respective torsionally-deformable members to be elastically spread and to be torsionally deformed, followed by entering the receiver to be prevented from coming out therefrom; and wherein the casing has slits formed in both sides thereof confronting the respective torsionally-deformable members of the holding member, the slits serving to cause portions of the casing confronting the torsionally-deformable members to be easily deformable so as not to prevent the torsionally-deformable members from being spread and deformed.

18. The article according to claim 17, wherein the casing member has a restriction slot formed in a bottom side thereof and the holding member has a projection at a lower end thereof, the projection being configured to engage in the restriction slot when the holding member is fitted into the casing.

* * * * *